United States Patent
McCandlish et al.

(10) Patent No.: US 7,492,486 B2
(45) Date of Patent: Feb. 17, 2009

(54) SYSTEMS AND METHODS FOR ADAPTIVE DYNAMIC RANGE ADJUSTMENT FOR IMAGES

(75) Inventors: Peter D. McCandlish, Rochester, NY (US); Ramesh Nagarajan, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 617 days.

(21) Appl. No.: 11/275,078

(22) Filed: Dec. 8, 2005

(65) Prior Publication Data

US 2007/0133062 A1    Jun. 14, 2007

(51) Int. Cl.
G06T 5/00 (2006.01)
G06K 9/40 (2006.01)

(52) U.S. Cl. ............... 358/3.27; 358/522; 358/504; 358/518; 382/168; 382/162; 382/167; 382/254

(58) Field of Classification Search ........... 358/522, 358/3.27, 1.9, 1.16, 536, 456, 404, 444, 516, 358/534, 521, 519, 520, 455, 463, 2.1, 3.2, 358/3.01, 3.06, 504, 518; 382/168, 169, 382/172, 274, 261, 206, 195, 260, 264, 275, 382/171, 167, 162, 254
See application file for complete search history.

(56) References Cited

U.S. PATENT DOCUMENTS

| | | | | |
|---|---|---|---|---|
| 5,347,374 A | * | 9/1994 | Fuss et al. | 358/522 |
| 5,553,171 A | | 9/1996 | Lin et al. | |
| 6,198,845 B1 | * | 3/2001 | Tse et al. | 382/169 |
| 6,205,257 B1 | * | 3/2001 | Eschbach | 382/261 |
| 6,236,751 B1 | * | 5/2001 | Farrell | 382/168 |
| 6,469,805 B1 | * | 10/2002 | Behlok | 358/1.9 |
| 6,594,401 B1 | * | 7/2003 | Metcalfe et al. | 382/275 |
| 7,336,401 B2 | * | 2/2008 | Unal et al. | 358/448 |
| 7,352,492 B2 | * | 4/2008 | Maltz | 358/3.01 |
| 7,426,312 B2 | * | 9/2008 | Dance et al. | 382/254 |
| 2001/0055122 A1 | * | 12/2001 | Nagarajan et al. | 358/1.9 |
| 2004/0114185 A1 | * | 6/2004 | Shiau et al. | 358/2.1 |

OTHER PUBLICATIONS

U.S. Appl. No. 11/126,970, filed May 11, 2005, McCandish.
Gonzalez et al., "Digital Image Processing," ISBN 0-201-50803-6, Addison-Wesley-Publishing Company, Inc., pp. 172-185, 1992.

* cited by examiner

Primary Examiner—Edward L Coles
Assistant Examiner—Charlotte M Baker
(74) Attorney, Agent, or Firm—Oliff & Berridge, PLC

(57) ABSTRACT

A method is described to match an original binary image with the dynamic range of a desired target document. The original binary image is restored first to contone and a histogram of the contone image is processed to generate a Tone Reproduction Curve (TRC) for the contone image with improved dynamic range. The histogram processing includes determining a histogram of the contone image, and generating the TRC based on matching the determined histogram with a target histogram profile. This helps in matching outputs from legacy devices to a desired quality.

20 Claims, 3 Drawing Sheets

SYSTEMS AND METHODS FOR ADAPTIVE DYNAMIC RANGE ADJUSTMENT FOR IMAGES

BACKGROUND

Many multi-functional network products produce a standard type of output, such as binary scanned output. It is desirable to extend these products to produce contone output from the network controller for interface with devices which do not operate on binary, requiring an input type that is different from the standard output type. It is also desirable to extend these products to produce contone output from the network controller for interface with devices that further process the output, using scanning software and or hardware, such as an optical character recognizer (OCR) or a forms processing device, which often require a different type of output, such as an 8-bit input.

SUMMARY

Various methods for converting binary output to contone output may be used. However, generally, the original binary data has been optimized for printing or to achieve high compression ratios in the case of scanned data. Thus, when the binary data is converted to contone data, the dynamic range of the image may not be optimal for image processing algorithms performing post-processing functions.

Tone reproduction curves (TRCs) may be applied to image data to optimize the data for output to a particular device. However, when data is binary, it is not possible to apply a TRC. Once data is converted to 8-bit contone, for example, this opens up the possibility to apply a TRC to optimize the image for input to third party device or devices for subsequent image processing, using, for example, image processing software.

A fixed TRC does not necessarily work well for all software applications. Accordingly, this disclosure provides systems and methods that may be used to dynamically determine a TRC for a particular image.

There are other techniques performed to match a binary data for a destination device that was originally targeted for a different device; for example, the algorithm described in U.S. Pat. No. 5,553,171 to Lin, et al. The drawback with such an approach is that it requires the actual destination printer spot model to produce the desired output and also requires to transform the input to an intermediate resolution that is four times bigger than the original, which is expensive.

In particular, systems and methods are provided for processing a histogram of a contone image to generate a TRC that results in a contone image with optimal dynamic range, such as upper and lower gray level limits tailored to a particular image. A dynamic range may be a range of grey levels that is used in an image. For example, when the entire image only has grey levels between 90 and 130, no pixels will appear totally white and no pixels will appear totally black. Such a dynamic range may be improved with a TRC. For example, the TRC may map 90 to 0 and 130 to 255 and may follow certain mathematical formula to appropriately map the points in between. The histogram processing may include determining a histogram of the contone image, and generating the TRC based on matching the determined histogram with a target histogram profile.

These and other features and details are described in, or are apparent from, the following detailed description.

BRIEF DESCRIPTION OF THE DRAWINGS

Various details of exemplary systems and methods are described, with reference to the following figures, wherein.

DETAILED DESCRIPTION OF EMBODIMENTS

A method for providing a contone image may include the steps of providing binary scanned data, converting the binary data to contone data, and applying a fixed TRC to the contone data to generate an improved contone image. However, as discussed above, the fixed TRC does not necessarily work well for all third-party devices or devices for processing using subsequent software and/or applications.

To improve the quality of the contone image by providing contone images with optimal dynamic ranges, systems and methods are provided to generate a TRC based on histogram processing. The histogram processing may take the form of different algorithms, including histogram matching with a target histogram (histogram specification), histogram equalization, or dynamic range enhancement.

Figure 1:
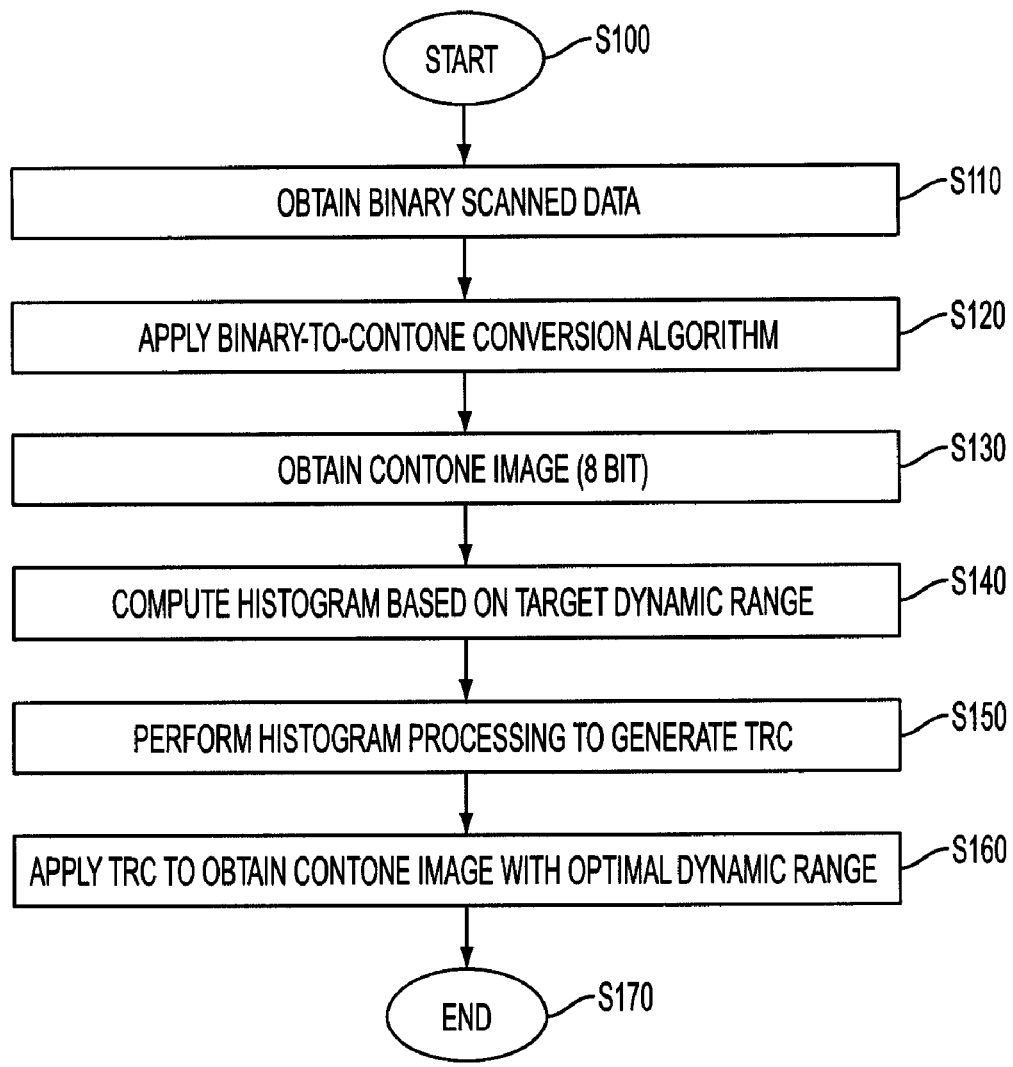
FIG. 1 is a flowchart outlining an exemplary method for generating a contone image with optimal dynamic range.

FIG. 1 is a flowchart outlining an exemplary method for providing contone images with optimal dynamic ranges. As shown in FIG. 1, process of the method starts at step S100 and continues to step S110, where binary scanned data is provided. Next, in step S120, the binary data is converted to contone data. The conversion of the binary data to contone data may be performed with, for example, the algorithm described in copending application Ser. No. 11/126,970 filed May 11, 2005 by Peter D. McCandlish, which is herein incorporated by reference in its entirety. Process of the method then continues to step S130.

In step S130, a contone image is provided based on the conversion from the binary data to the contone data. The contone image may be an 8-bit image or the like. Next, in step S140, a histogram of the contone image is determined. The histogram may, for example, represent frequency distribution of image pixels. The distribution range may cover the gray levels or color levels of the contone image, such as the gray levels and/or color levels of an 8-bit image. The distribution range may be adjusted to cover the range of the histogram profile of a target image, so as to match the histogram of the contone image with the histogram profile of the target image, as discussed in greater detail below.

In exemplary embodiments, the frequencies may be cumulative frequencies. For example, for a 256 gray level distribution of an 8-bit image, the frequency of pixel occurrence at gray level 5 may be defined as the total number of pixels occurring at gray level 5 and gray levels below 5. Thus, the frequency at gray level 5 may be defined as the number of pixels occurring at gray levels 0-5, and the frequency at gray level 10 may be defined as the number of pixels occurring at gray levels 0-10.

Similarly and alternatively, the frequency at gray level 5 may also be defined as the total number of pixels occurring at gray level 5 and gray levels above 5. In this case, the frequency at gray level 5 is defined as the total number of pixels occurring at gray levels 5-255. An example of cumulative histograms based on cumulative frequencies will be discussed in greater detail below in connection with FIG. 2.

A target image may be provided for the contone image to match. The target image may be an image based on prior knowledge of images similar to the contone image. For example, the contone image may be an image of a standard invoice form filled with data associated with a specific merchandise order. The target image may be an image of the standard invoice form prior to being filled with the data associated with the specific order. The target image may have been set with proper contrast, color and/or the like. Thus, the histogram profile of the target image represents a general shape of the expected histogram of the contone image.

The target image may be selected, or otherwise provided, based on determination and/or prior knowledge of the category or type of the contone image. Examples of categories and types may include, for example, a driver's license, a document which contains only text, a college transcript, forms containing light text or handwritten notes, faded documents, and the like. For example, the contone image may be compared with the target image, and then adjusted accordingly. For example, if the contone image is too bright or too dark, its histogram will be significantly different from that of the target image of its category or type. Thus, the upper and lower brightness limits of the contone image may be adjusted so that the histogram of the contone image is shifted into a shape similar to that of the histogram of the target image, as described in greater detail below in connection with step S150 of FIG. 1.

In step S150 of FIG. 1, histogram processing is performed to generate a TRC for the contone image. The generated TRC may map gray levels in the contone image to different gray levels based on the histogram profile of the target image. For example, the TRC may map a first gray level of the contone image to a second gray level of the contone image, if the frequency corresponding to the first gray level of the contone image is similar to a frequency in the target image at a gray level of the target image similar to the second gray level of the contone image. An exemplary matching method will be discussed in greater detail below in connection with FIG. 2 and equations 1-3.

The histogram processing may take the form of a variety of different algorithms, including histogram matching with a target histogram (histogram specification), histogram equalization, and dynamic range enhancement. Examples of histogram specification and histogram equalization are described in Gonzalez et al., *Digital Image Processing*, ISBN 0-201-50803-6, Addison-Wesley Publishing Company, Inc., 1992, which is incorporated by reference in its entirety. An exemplary embodiment of the dynamic range enhancement algorithm using the matching method will be described below in connection with FIG. 2. in general, histogram matching, as described here, is a subset of histogram specification where the histogram that is specified is derived from the histogram of an image or a set of images. Histogram equalization is also a subset of histogram specification where the cumulative histogram that is specified is a simple straight line. Thus, histogram matching may be performed by matching a histogram with a reference histogram. The reference histogram may be associated with a function, a line, such as a straight line, a mathematical equation, or the like.

In step S160 of FIG. 1, the generated TRC is applied to the contone image, to obtain a contone image with optimal dynamic range. Thereafter, process of the method goes to step S170, where process of the method ends.

Figure 2:
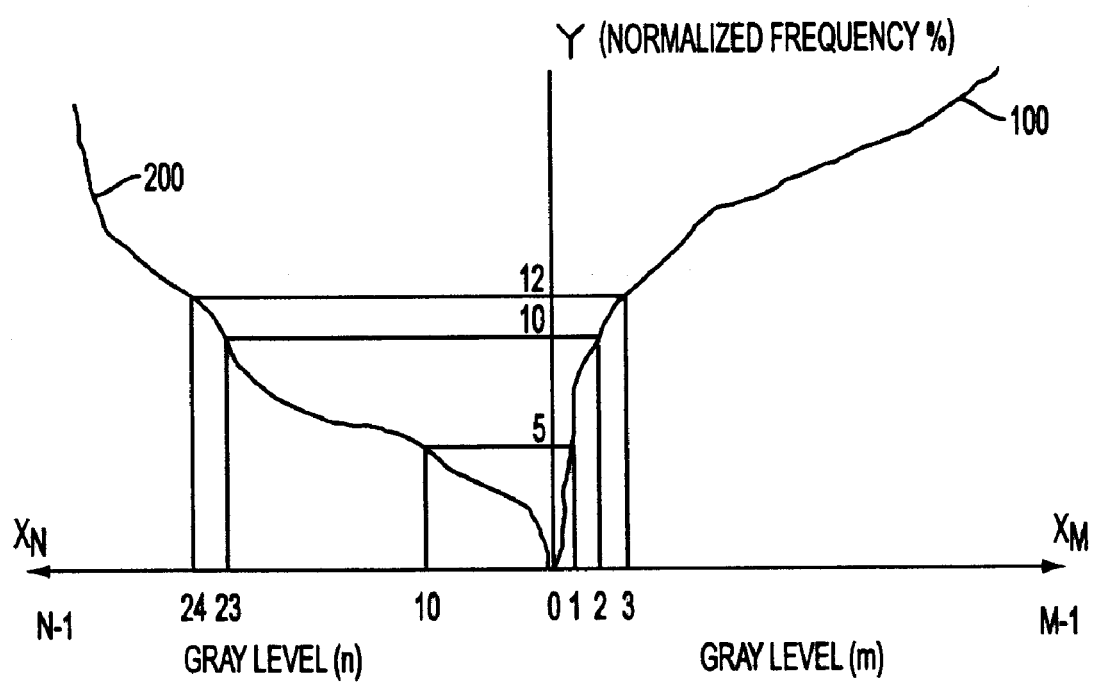
FIG. 2 illustrates a method for matching a histogram of a contone image with a target histogram profile.

FIG. 2 illustrates an exemplary method for obtaining a contone image with optimal dynamic range. The method illustrated in FIG. 2 uses a dynamic range enhancement algorithm with cumulative histograms.

In particular, the right-hand side of FIG. 2 contains a histogram profile 100 for a contone image, and the left-hand side of FIG. 2 contains a histogram profile 200 for a target image. The X-axis of the histogram profile 100 represents gray levels of the contone image and extends towards the right-hand side from zero to M−1. The X-axis of the histogram profile 200 represents gray levels of the target image and extends towards the left-hand side from zero to N−1. The Y-axis represents cumulative pixel frequency distribution and is shared by both histogram profiles 100 and 200. The frequency in Y-axis is normalized frequency expressed in percentage (%). As shown in FIG. 2, the histogram profile 100 is obtained for a contone image. The histogram profile 100 shown in FIG. 2 represents cumulative pixel frequency Y distributed at gray levels m=0, 1, 2 . . . , M−1, where M is the maximum gray level. For an 8-bit image, M=256.

The histogram profile 100 increases monotonically as gray level m increases. The histogram profile 100 increases monotonically because the histogram profile is a cumulative pixel frequency distribution. As shown in FIG. 2, the cumulative frequency value of the histogram profile 100 is Y=0, 5, 10 and 12% at gray levels m=0, 1, 2 and 3, respectively.

The histogram profile 200 of a target image is shown on the left-hand side of FIG. 2. In particular, the histogram profile 200 of the target image represents frequency distribution Y distributed at gray levels n=0, 1, 2 . . . , N−1, where N represents the maximum number of gray levels. For an 8-bit target image, N=256.

As shown in FIG. 2, the histogram profile 200 represents a cumulative histogram that increases monotonically as gray level n increases, with cumulative frequency values 0, 5, 10 and 12% at gray levels n=0, 10, 23 and 24, respectively.

In the exemplary embodiment illustrated in FIG. 2, the histogram profile 200 is normalized. Thus, the cumulative frequency values 0, 5, 10 and 12 are percentage values 0%, 5%, 10% and 12%, and the value at n=255 is 100%. The cumulative histogram profile 200 may represent probability densities. Mathematically, a cumulative frequency value $h_{Tn}$ at gray level n may be expressed as:

$$h_{Tn} = \sum_{i=0}^{n} p1_i \qquad (1)$$

where $p1_i$ represents the pixel number (or non-cumulative frequency) at gray level i.

Similarly, in the exemplary embodiment illustrated in FIG. 2, the histogram profile 100 is normalized. The cumulative histogram profile 100 may represent probability densities. Mathematically, each frequency value $h_{Im}$ at a gray level n may be expressed as a summation of the frequencies of occurrence given by:

$$h_{Im} = \sum_{j=0}^{m} p2_j \qquad (2)$$

where $p2_j$ represents the pixel number (or non-cumulative frequency) at gray level j.

As discussed above, both histogram profiles 100 and 200 represent cumulative histograms. Also, both the histogram profile 100 and the histogram profile 200 are normalized. Thus, the cumulative frequency value of histogram profile 100 at the last bin (m=M−1) equals the cumulative frequency value of histogram profile 200 at n=N−1.

When performing this histogram processing method, it may be assumed that both the contone image and the target image have the same dynamic range. Thus, it may be assumed that N=M. Alternatively, N and M may be different integers. In particular, N and M are based on the number of bits in the images. N=M is a simple case for an example. It is possible, however, that the original image and the target image could have different bits. For example, the original image could be 8 bits and the target image could be 10.

For matching histograms between the contone image and the target image, a TRC may be defined as discrete values at different gray levels, such as $TRC_m$, wherein m=0, 1, 2, ..., M−1, and M is the maximum number of gray levels. For 8-bit images, M=256.

The TRC may be determined for the contone image at gray level m as the minimum gray level n of the target image that represents a frequency value $h_{Tn}$ greater or equal to the frequency value $h_{Im}$ at gray level m of the contone image. That is:

$$TRC_m = \min n, \text{ where } h_{Tn} > h_{Im} \qquad (3)$$

As shown in FIG. 2, the frequency value of the histogram profile 100 is 5 at m=1. Such a frequency value may be confirmed by, for example, drawing a vertical line starting from m=1. The vertical line intersects with histogram profile 100 at frequency value 5.

As shown in FIG. 2, the minimum gray level having a frequency value on the histogram profile 200 greater than or equal to 5 is n=10. This may be confirmed by drawing a horizontal line starting from the intersection of the vertical line and histogram profile 100. The horizontal line intersects with histogram profile 200, and the gray level value corresponding to this intersection is n=10. Accordingly, based on equation 3, $TRC_1$=10. Thus, m=1 maybe mapped to n=10.

Similarly, from FIG. 2, it may be identified that $TRC_2$=23, and $TRC_3$=24, respectively. Thus, m=2 and m=3 may be mapped to n=23 and n=24, respectively.

The TRC thus obtained provides a mapping between the contone image and the target image. Such a mapping provides a match between the histograms of the contone image and the target image, and shifts the gray levels of the contone image closer to those of the target image. Such a process improves the quality of the contone image, and may result in contone image with improved and possibly optimal dynamic range.

In the process described above, the determination of the TRC starts from a gray level m of the histogram profile 100 on the right-hand side of FIG. 2, so as to match a gray level n of the histogram profile 200 on the left-hand side of FIG. 2. Alternatively, the determination of the TRC may also start from a gray level n of the histogram profile 200 on the left-hand side of FIG. 2, so as to match a gray level m of the histogram profile 100 on the right-hand side of FIG. 2. For example, as shown in FIG. 2, the frequency value of the histogram profile 200 is 5 at n=10. Such a frequency value may be confirmed by, for example, drawing a vertical line starting from n=10. The vertical line intersects with histogram profile 200 at frequency value 5.

As shown in FIG. 2, the maximum gray level having a frequency value on the histogram profile 100 less than or equal to 5 is m=1. This may be confirmed by drawing a horizontal line starting from the intersection of the above vertical line and histogram profile 200. The horizontal line intersects with histogram profile 100, and the gray level value corresponding to this intersection is m=1. Accordingly, n=1 may be mapped to m=1. In this regard, the TRC may be defined as discrete values $TRC_n$, and equation 3 may be substituted by:

$$TRC_n = \max m, \text{ where } h_{Im} < h_{Tn} \qquad (4)$$

The method illustrated in FIGS. 1 and 2 may be implemented in a computer program product that can be executed on a computer or transmitted with a carrier wave. The computer program product may be a computer-readable recording medium on which a control program is recorded, or it may be a transmittable carrier wave in which the control program is embedded as a data signal.

Figure 3:
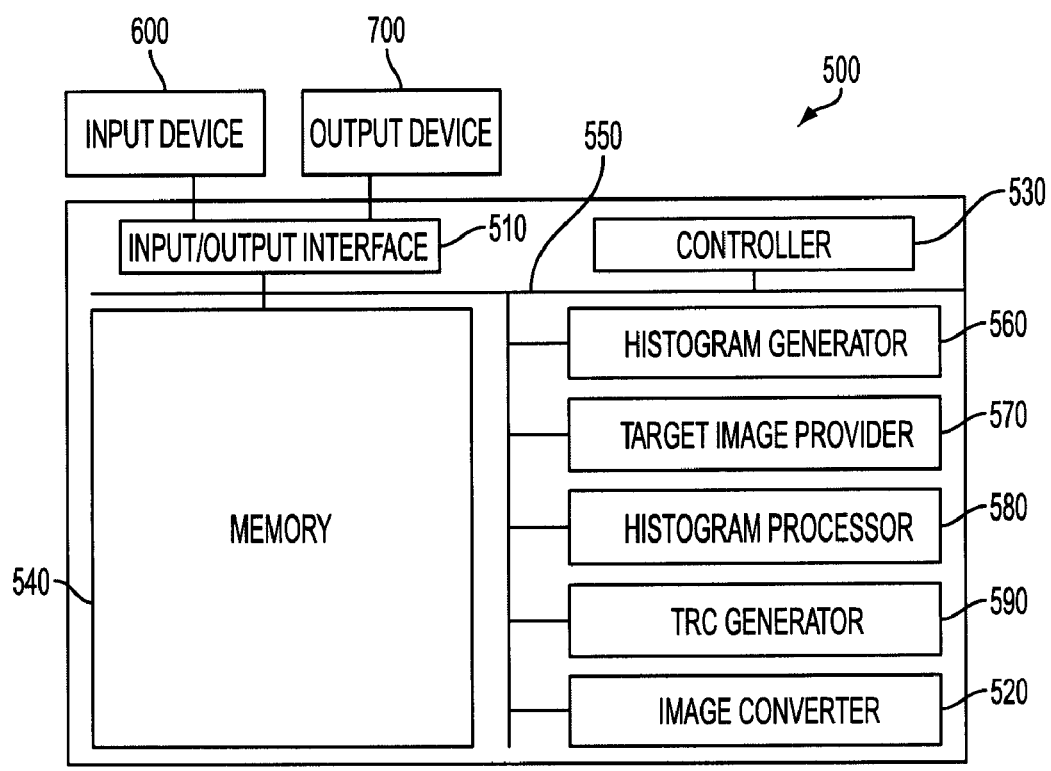
FIG. 3 is a block diagram illustrating an exemplary system for providing a contone image with optimal dynamic range.

FIG. 3 is a block diagram outlining one exemplary embodiment of a system for providing improved contone images. As shown in FIG. 3, the system 500 includes an input/output interface 510, a controller 530, a memory 540, a histogram generator 560, a target image provider 570, a histogram processor 580, and a TRC generator 590, each interconnected by a data bus or application programming interface 550.

The interface 510 receives input from an input device 600. The input may include a converted 8-bit contone image, such as an 8-bit contone image converted from a 1 bit binary image. The input may also provide target image information. The interface 510 outputs processed results to an output device 700. The output may include improved contone images, e.g., contone images with optimal dynamic range.

The memory 540 stores information, such as target images, histogram profiles of target images, and/or intermediate results processed by the system 500. The histogram generator 560 generates a histogram profile for a contone image. The histogram generator 560 may also generate a histogram profile of a target image.

The target image provider 570 provides a target image or a histogram profile of a target image that is stored in the memory 550 or received by input device 510. The histogram processor 580 performs histogram processing, including comparison and match between histograms of the contone image and the target image.

The TRC generator 590 generates a TRC for the received contone image. The TRC generator 590 also applies the generated TRC to the received contone image to produce improved contone image to be output to the output device 700.

In operation, the interface 510 receives a converted contone image from the input device 600. The histogram generator 560, under control of the controller 530, generates a histogram of the contone image. The target image provider 570, under control of the controller 530, provides a target image or a histogram profile of a target image.

The histogram processor 580, under control of the controller 530, performs histogram processing, including comparison and match between the contone image and the target image. The TRC generator 590, under control of the controller 530, generates TRC for the contone image, and applies the generated TRC to the contone image to provide an improved contone image, e.g., a contone image with optimal dynamic range. The improved contone image is output to the output device 520.

In an exemplary embodiment, the system 500 in FIG. 3 may further comprise an image converter 520 that converts a binary image to a contone image. In such an exemplary embodiment, the interface 510 receives the binary image. The image converter 520, under control of the controller 530, converts the binary image to the converted contone image before the histogram generator 560 begins to generate a histogram for the contone image.

The system 500 in FIG. 3 may be used in a raster optical scanner, a xerographic marking device, a printer, or the like.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A computer-implemented method for enhancing a contone image, comprising:
   generating a tone reproduction curve using a tone reproduction curve generator for the contone image based on a match between a histogram of the contone image and a reference of a target image; and
   applying the generated tone reproduction curve to the contone image.

2. The method of claim 1, further comprising:
generating the histogram of the contone image.

3. The method of claim 1, wherein:
the histogram of the contone image represents occurrences of pixels of the contone image at gray levels of the contone image; and
the target image represent a type of image to which the contone image belongs, the reference of the target image being a histogram of the target image that represents occurrences of pixels of the target image at gray levels of the target image.

4. The method of claim 3, wherein the histogram of the contone image and the histogram of the target image are cumulative histograms.

5. The method of claim 4, wherein:
the histogram of the target image has discrete values $h_{Tn}$ expressed as:

$$h_{Tn} = \sum_{i=0}^{n} p1_i$$

where $p1_i$ represents non-cumulative pixel occurrence frequency at gray level i, gray level n=0, 1, 2, . . . , N−1, and N represents maximum number of gray levels in the target image;
the histogram of the contone image has discrete values $h_{Im}$ expressed as:

$$h_{Im} = \sum_{j=0}^{m} p2_j$$

where $p2_j$ represents non-cumulative pixel occurrence frequency at gray level j, gray level m=0, 1, 2, . . . , M−1, and M represents maximum number of gray levels in the contone image; and
the tone reproduction curve comprises discrete components $TRC_m$ determined by:

$TRC_m$=min n, where $h_{Tn}$>$h_{Im}$.

6. The method of claim 5, wherein N=M.

7. The method of claim 5, wherein the contone image is an 8-bit image and M=256.

8. The method of claim 1, further comprising:
converting a binary image to the contone image.

9. A computer readable recording medium including computer-executable instructions for performing the method recited in claim 1.

10. A system for enhancing contone images, comprising:
a controller;
a histogram processor; and
a tone reproduction curve generator,
wherein:
the controller controls the histogram processor to match a histogram of a contone image with a reference of a target image,
the controller controls the tone reproduction curve generator to generate a tone reproduction curve for the contone image based on a match between the histogram of the contone image and the reference of the target image, and
the controller applies the generated tone reproduction curve to the contone image.

11. The system of claim 10, further comprising:
a histogram generator; and
a target image provider,
wherein
the reference of the target image is a histogram of the target image, and
the controller controls the histogram generator to generate the histogram of the contone image, and controls the target image provider to provide the histogram of the target image.

12. The system of claim 11, wherein:
the histogram of the contone image represents occurrences of pixels of the contone image at gray levels of the contone image; and
the target image represent a type of images to which the contone image belongs, the histogram of the target image representing occurrences of pixels of the target image at gray levels of the target image.

13. The system of claim 11, wherein the histogram of the contone image and the histogram of the target image are cumulative histograms.

14. The system of claim 13, wherein:
the histogram of the target image has discrete values $h_{Tn}$ expressed as:

$$h_{Tn} = \sum_{i=0}^{n} p1_i$$

where $p1_i$ represents non-cumulative pixel occurrence frequency at gray level i, gray level n=0, 1, 2, . . . , N−1, and N represents maximum number of gray levels in the target image;
the histogram of the contone image has discrete values $h_{Im}$ expressed as:

$$h_{Im} = \sum_{j=0}^{m} p2_j$$

where $p2_j$ represents non-cumulative pixel occurrence frequency at gray level j, gray level m=0, 1, 2, . . . , M−1, and M represents maximum number of gray levels in the contone image; and
the tone reproduction curve comprises discrete components $TRC_m$ determined by:

$TRC_m$=min n, where $h_{Tn}$>$h_{Im}$.

15. The system of claim 14, wherein N=M.

16. The system of claim 14, wherein the contone image is an 8-bit image and M=256.

17. The system of claim 10, further comprising:
an image converter,
wherein the controller controls the image converter to convert a binary image to the contone image.

18. A raster optical scanner including the system of claim 10.

19. A xerographic marking device including the system of claim 10.

20. A printer including the system of claim 10.

* * * * *